(12) United States Patent
Pfeiffer

(10) Patent No.: US 7,321,573 B2
(45) Date of Patent: Jan. 22, 2008

(54) RADIO AND DATA NETWORK SYSTEM

(76) Inventor: Jeffrey C. Pfeiffer, 6350 Bills Rd., Naples, NY (US) 14512

( * ) Notice: Subject to any disclaimer, the term of this patent is extended or adjusted under 35 U.S.C. 154(b) by 1079 days.

(21) Appl. No.: 10/230,556

(22) Filed: Aug. 29, 2002

(65) Prior Publication Data

US 2004/0042422 A1 Mar. 4, 2004

(51) Int. Cl.
*H04Q 7/00* (2006.01)

(52) U.S. Cl. .................. 370/328; 455/450; 370/437

(58) Field of Classification Search ............ None
See application file for complete search history.

(56) References Cited

U.S. PATENT DOCUMENTS

| | | | |
|---|---|---|---|
| 6,421,714 B1* | 7/2002 | Rai et al. ............... | 709/217 |
| 6,697,103 B1* | 2/2004 | Fernandez et al. .......... | 348/143 |
| 2001/0022615 A1* | 9/2001 | Fernandez et al. .......... | 348/143 |
| 2001/0029613 A1* | 10/2001 | Fernandez et al. .......... | 725/105 |
| 2002/0057340 A1* | 5/2002 | Fernandez et al. .......... | 348/143 |
| 2003/0210671 A1* | 11/2003 | Eglin ..................... | 370/338 |

* cited by examiner

Primary Examiner—Bob A. Phunkulh
(74) Attorney, Agent, or Firm—Phillips Lytle LLP

(57) ABSTRACT

An improved radio and data network system (15) for communicating data to a user comprising a radio (19), a data collection unit (20), the data collection unit operatively adapted to communicate with the radio, a first tower (21) having a defined first coverage area (22), the first tower operatively adapted to communicate with the radio when the radio is in the first coverage area, a hub (25), a computer network (28), the hub operatively adapted to communicate with the first tower and with the computer network, the data collection unit, radio, first tower and hub so configured and arranged that data from the collection unit is transmittable by the radio to the first tower when the radio is in the first coverage area, is transmittable from the first tower to the hub, and is accessible to the user via the computer network. The hub may comprise a first server (29) operatively adapted to communicate with the first tower and a second server (30) operatively adapted to communicate with the computer network and the first server. The invention also provides a method for communicating data to a user. The invention also provides a radio switching system The invention also provides a method for switching a radio from a control channel to a data channel.

64 Claims, 7 Drawing Sheets

RADIO AND DATA NETWORK SYSTEM

TECHNICAL FIELD

The present invention relates generally to the field of radio networks and, more particularly, to an improved two-way radio data network system with enhanced data communication capabilities.

BACKGROUND ART

Mobile radio communication systems are used extensively in the U.S. to provide communication between fleet operators whose vehicles travel regularly on a regional basis. Typically, these types of systems are used by fire departments, emergency medical services, police, schools, government agencies, and 911 control centers for voice communications. In addition, such systems are used by manufacturing plants for maintenance coordination, security, and safety, as well as by service operators, where dispatching and verbal internal organizational communication is needed between and among field operators and control bases.

Two-way systems used in the prior art, however, are limited in capacity, generally having only been used to communicate voice signals. The communication of data over a wide area in the prior art has been limited to cellular applications wherein a cellular transmission is required each time data is being sent.

The prior art does not allow for an efficient means for transmitting data over a wide area using radio signals in such a way that a remote user may access data collected and communicated through a two-way radio.

Accordingly, it would be beneficial to have a data network system which allowed for data linking between a data collection device used in conjunction with a radio and a user workstation connected to a computer network.

DISCLOSURE OF THE INVENTION

With parenthetical reference to the corresponding parts, portions or surfaces of the disclosed embodiment, merely for the purposes of illustration and not by way of limitation, the present invention provides an improved radio and network system (15) for communicating data to a user comprising a radio (19), a data collection unit (20), the data collection unit operatively adapted to communicate with the radio, a first tower (21) having a defined first coverage area (22), the first tower operatively adapted to communicate with the radio when the radio is in the first coverage area, a hub (25), a computer network (28), the hub operatively adapted to communicate with the first tower and with the computer network, the data collection unit, radio, first tower and hub so configured and arranged that data from the collection unit is transmittable by the radio to the first tower when the radio is in the first coverage area, is transmittable from the first tower to the hub, and is accessible to the user via the computer network.

The network system may have a data collection unit selected from a group consisting of a temperature gauge, an electronic fuel monitor, a global positioning system, an odometer, a fare meter, an engine control interface, and a laptop computer, and the data collection unit may be an internal component of the radio.

The radio may transmit on a data channel and a control channel. The control channel may comprise a voice channel, a tower marker beacon, and/or may be a function of the defined coverage area. The data channel may be a function of the control channel.

The radio may have automatic roaming capability and may be operatively adapted to selectively alternate between transmitting on the control channel and transmitting on the data channel.

The network system may further comprise a second tower (23) having a defined second coverage area (24), the second tower operatively adapted to communicate with the radio when the radio is in the second coverage area, the hub operatively adapted to communicate with the second tower, and the data collection unit, radio, second tower and hub so configured and arranged that data from the collection unit is transmittable by the radio to the second tower when the radio is in the second coverage area, is transmittable from the second tower to the hub, and is accessible to the user via the computer network.

The hub may comprise a first server (29) operatively adapted to communicate with the first tower and a second server (30) operatively adapted to communicate with the computer network and the first server, and a third server (31) operatively adapted to communicate with the first tower, the second tower, the first server and the second server. The third server may communicate, through one of the towers, with the radio, and the first server may communicate, through one of the towers, with the radio on the data channel. The hub may comprise a firewall between the computer network and the second server. The radio may include a radio identifier that is associated with data transmitted by the radio.

The network system may comprise a user workstation (33) operatively adapted to communicate with the hub via the computer network, and the workstation may be a personal computer and may include a station identifier that is associated with the workstation. The radio identifier may correspond to the station identifier, the hub may be configured and arranged to operatively sort data based on the radio identifier associated with the data, and the hub may be configured and arranged such that data associated with the radio identifier is selectively accessible to a workstation having a station identifier corresponding to the radio identifier.

The hub may comprise a switch (34) connecting the first server, second server and third server. The computer network may comprise the world wide web, a wide area network, a local area network and/or a communications satellite. The network system may further comprise a second workstation (35) having a second station identifier corresponding to the radio identifier. The data and control channels may be digital and/or analogue. The network system may comprise a second tower (36) having a defined second coverage area (38), the second tower operatively adapted to communicate with the radio when the radio is in the second coverage area, a second hub (26) operatively adapted to communicate with the second tower and with the computer network, the data collection unit, radio, second tower and second hub so configured and arranged that data from the collection unit is transmittable by the radio to the second tower when the radio is in the second coverage area, is transmittable from the second tower to the second hub, and is accessible to the user via the computer network.

The present invention also provides an improved network system for communicating a signal, comprising a radio, a display device (39), the display device operatively adapted to communicate with the radio, a first tower having a defined first coverage area, the first tower operatively adapted to communicate with the radio when the radio is in the first coverage area, a hub, a computer network, the hub operatively adapted to communicate with the first tower and with the computer network, a user workstation, the user workstation operatively adapted to communicate with the hub via the computer network, and the workstation, hub, first tower, radio and display device so configured and arranged that a signal from the workstation is transmittable from the workstation to the hub via the computer network, is transmittable from the hub to the first tower, is transmittable from the first tower to the radio when the radio is in the first coverage area, and is displayable on the display device. The display device may be a computer monitor. The radio may transmit on a data channel and a control channel, the control channel may comprise a voice channel and/or a tower marker beacon, the radio may have automatic roaming capability, and the radio may be operatively adapted to selectively alternate between receiving on the control channel and receiving on the data channel.

The network system may further comprise a second tower having a defined second coverage area, the second tower operatively adapted to communicate with the radio when the radio is in the second coverage area, the hub operatively adapted to communicate with the second tower, and the workstation, hub, second tower, radio and display device so configured and arranged that a signal from the workstation is transmittable from the workstation to the hub via the computer network, is transmittable from the hub to the second tower, is transmittable from the second tower to the radio when the radio is in the second coverage area and is displayable on the display device.

The network system may comprise a second tower having a defined second coverage area, the second tower operatively adapted to communicate with the radio when the radio is in the second coverage area, a second hub operatively adapted to communicate with the second tower and with the computer network, the workstation, second hub, second tower, radio and display device so configured and arranged that a signal from the workstation is transmittable from the workstation to the hub via the computer network, is transmittable from the hub to the first tower, is transmittable from the first tower to the radio when the radio is in the second coverage area, and is displayable on the display device.

The invention also provides a method for communicating data to a user comprising the steps of providing a radio, providing a data collection unit operatively adapted to communicate with the radio, providing a first tower having a defined first coverage area and operatively adapted to communicate with the radio when the radio is in the first coverage area, providing a computer network, providing a hub operatively adapted to communicate with the first tower and the computer network, collecting data with the data collection unit, transmitting the data from the data collection unit to the radio, transmitting the data from the radio to the first tower when the radio is in the first coverage area, transmitting the data from the first tower to the hub and providing the data for access to a user via the computer network. The steps of transmitting the data from the first tower to the hub and providing the data for access to a user via the computer network may comprise the steps of providing a first server operatively adapted to communicate with the tower, providing a second server operatively adapted to communicate with the computer network and the first server, transmitting the data from the tower to the first server, transmitting the data from the first server to the second server, and providing the data for access to the user via the computer network and the second server. The method may further comprise the steps of providing a firewall between the computer network and the second server, providing a router (40) communicating with the second server and the firewall, transmitting the data from the second serve to the router, transmitting the data from the router to the firewall, the firewall creating a network address translation, and transmitting the data through the computer network to the user. The method may further comprise the steps of providing a workstation operatively adapted to communicate with the hub via the computer network, associating a radio identifier with data transmitted by the radio, associating a station identifier with the workstation, the hub corresponding the radio identifier with the station identifier, the hub sorting data based on the radio identifier associated with the data, providing data associated with the radio identifier selectively accessible to a workstation having a station identifier corresponding to the radio identifier. The method may further comprising the step of providing a second workstation having a second station identifier corresponding to the radio identifier. The method may further comprise the steps of providing a second tower having a defined second coverage area and operatively adapted to communicate with the radio when the radio is in the second coverage area, providing the hub operatively adapted to communicate with the second tower, transmitting the data from the radio to the second tower when the radio is in the second coverage area, and transmitting the data from the second tower to the hub. The method may further comprise the steps of providing a second tower having a defined second coverage area and operatively adapted to communicate with the radio when the radio is in the second coverage area, providing a second hub operatively adapted to communicate with the second tower and with the computer network, transmitting the data from the radio to the second tower when the radio is in the second coverage area, and transmitting the data from the second tower to the second hub.

The invention also provides a method for communicating a signal comprising the steps of providing a radio, providing a display device operatively adapted to communicate with the radio, providing a first tower having a defined first coverage area and operatively adapted to communicate with the radio when the radio is in the first coverage area, providing a computer network, providing a server hub operatively adapted to communicate with the first tower and the computer network, providing a workstation operatively adapted to communicate with the hub via the computer network, transmitting a signal from the workstation to the hub via the computer network, transmitting the signal from the hub to the first tower, transmitting the signal from the first tower to the radio, displaying the signal on the display device. The steps of transmitting the signal from the workstation to the hub and transmitting the signal from the hub to the first tower may comprise the steps of providing a first server operatively adapted to communicate with the tower, providing a second server operatively adapted to communicate with the computer network and the first server, transmitting the signal from the workstation to the second server via the computer network, transmitting the signal from the second server to the first server, transmitting the signal from the first server to the first tower. The method may further comprise the steps of providing a second tower having a defined second coverage area and operatively adapted to communicate with the radio when the radio is in the second coverage area, providing a third server operatively adapted to communicate with the first tower, the second tower, the first server and the second server, and sending a notice from the third server to the radio indicating that the radio is to receive a transmission on a data channel of the radio. The method may further comprising the steps of sending a notice from the radio to the first server indicating that the radio is ready-to-receive a transmission on the data channel, and sending a notice from the first server to the second server prompting the second server to transmit the signal. The method may further comprise the steps of providing a firewall, providing a router operatively adapted to communicate with the firewall, the first server and the second server, transmitting the signal from the workstation to the firewall, the firewall creating a network address translation, transmitting the signal from the firewall to the router, and transmitting the signal from the router to the second server. The method may further comprise the steps of associating a radio identifier with the radio, associating a station identifier with signals transmitted from the workstation, the hub corresponding the radio identifier with the station identifier, the hub sorting signals based on the station identifier associated with the signal, transmitting signals associated with the station identifier to a radio having a radio identifier corresponding to the station identifier. The method may further comprise the step of providing a second radio having a second radio identifier corresponding to the station identifier. The method may further comprise the steps of providing a second tower having a defined second coverage area and operatively adapted to communicate with the radio when the radio is in the second coverage area, providing the hub operatively adapted to communicate with the second tower, transmitting the signal from the hub to the second tower when the radio is in the second coverage area; and transmitting the data from the second tower to the hub. The method may further comprise the step of determining if the radio is in the first coverage area or the second coverage area. The method may further comprise the steps of providing a second tower having a defined second coverage area and operatively adapted to communicate with the radio when the radio is in the second coverage area, providing a second hub operatively adapted to communicate with the second tower and with the computer network, transmitting the signal from the workstation to the second hub via the computer network when the radio is in the second coverage area, transmitting the signal from the second hub to the second tower, and transmitting the signal from the second tower to the radio. The step of determining if the radio is in the first coverage area or the second coverage area may comprise the step of first determining if the radio is in the coverage area the radio last transmitted or received from.

The invention also provides a radio switching system comprising a radio, the radio operatively adapted to transmit and receive on a control channel or a data channel and to roam on the control channel, the control channel having a switching protocol that defines a switch signal, a tower having a defined coverage area and operatively adapted to communicate with the radio when the radio is in the coverage area, a hub operatively adapted to communicate with the tower, the radio operatively adapted to switch the radio from receiving on the control channel to receiving on the data channel when the radio receives a switch signal, and the hub operatively adapted to initiate the transmission of the switch signal. The hub may comprise a first server operatively adapted to communicate with the tower, a second server operatively adapted to store data and to communicate with the first server, a third server operatively adapted to communicate with the tower and the first server and to initiate the transmission of the switch signal. The radio switching system may comprise the radio being operatively adapted to send a clear-to-receive signal to the first server on the data channel after receiving the switch signal, the first server is operatively adapted to send a server-transmit signal to the second server after receiving the clear-to-receive signal, the second server is operatively adapted to transmit the data to the first server after receiving the server-transmit signal, and the first server is operatively adapted to transmit the data to the tower after the first server receives the data from the second server.

The invention also provides a method for switching a radio from a control channel to a data channel, the method comprising the steps of providing a radio operatively adapted to transmit and receive on a control channel or a data channel, providing the control channel with a switching protocol that defines a switch signal, providing a tower having a defined coverage area and operatively adapted to communicate with the radio when the radio is in the coverage area, providing a hub operatively adapted to communicate with the tower, sending the switch signal from the tower to the radio, the radio switching from receiving on the control channel to receiving on the data channel after receiving the switch signal. The steps of providing a hub and sending a switch signal may comprise the steps of providing a first server operatively adapted to communicate with the tower, providing a second server operatively adapted to store data and to communicate with the first server, providing a third server operatively adapted to communicate with the tower and the first server, sending a prompt signal from the second server to the third serve, the third server initiating the sending of the switch signal from the first tower to the radio after receiving the prompt signal from the second server. The method may further comprising the steps of sending a clear-to-receive signal from the radio to the first server on the data channel after receiving the switch signal, sending a server-transmit signal from the first server to the second server after the first server receives the clear-to-receive signal, transmitting the data from the second server to the first server after the second server receives the server-transmit signal, transmitting the data from the first server to the tower after the first server receives the data from the second server.

DESCRIPTION OF THE PREFERRED EMBODIMENTS

Figure 1:
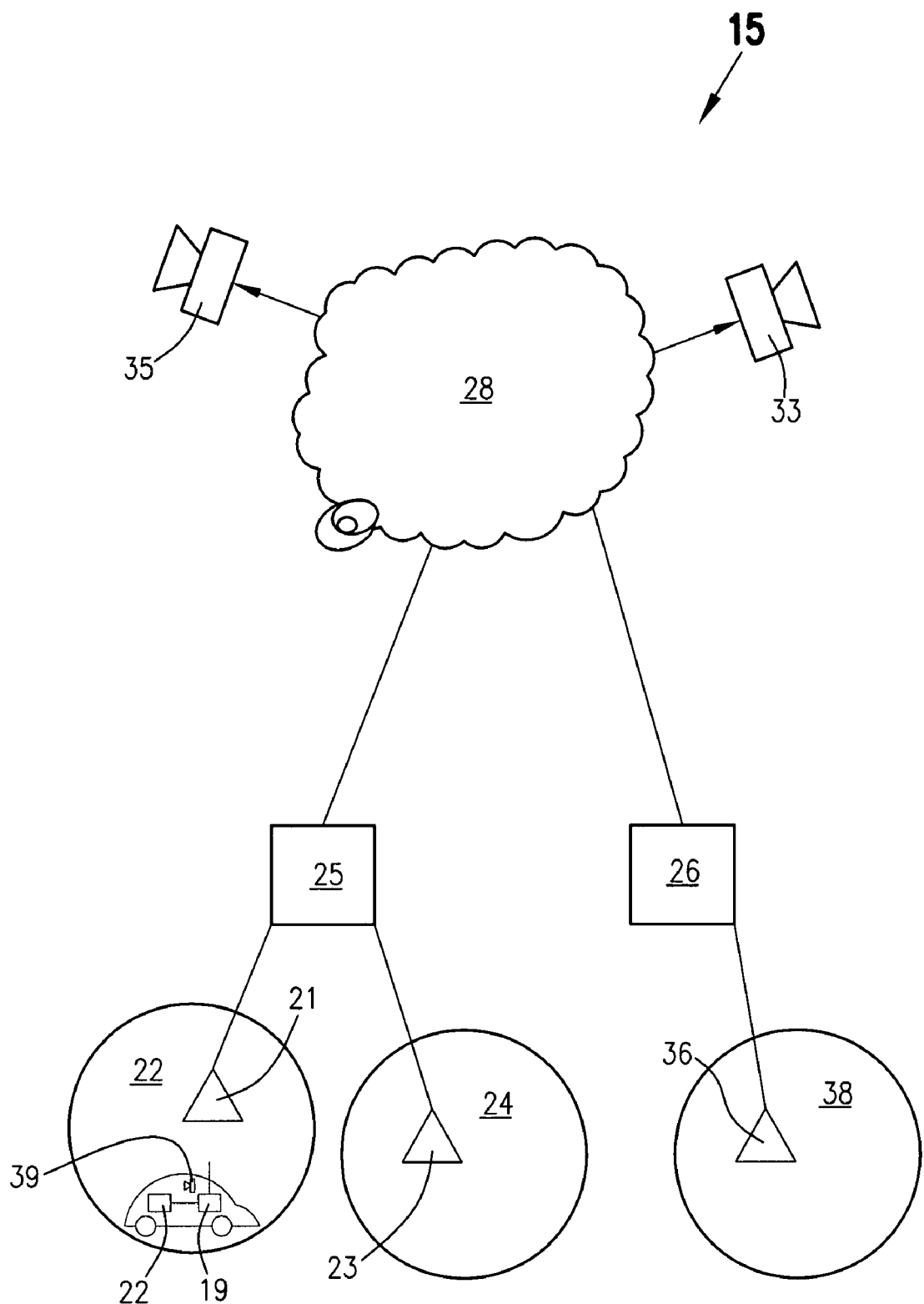
FIG. 1 is a partial schematic of the improved communication system.

At the outset, it should be clearly understood that like reference numerals are intended to identify the same structural elements, portions or surfaces, consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

This invention provides an improved data communications network system, of which the presently preferred embodiment is generally indicated at 15. As shown in FIG. 1, the improved communications network system generally comprises a number of towers, e.g. 21, 23 and 36, a number of hubs, 25 and 26, a number of workstations, 33 and 35, a radio 19, a data collection unit 20 and a display device 39. These elements link to a conventional communication system such as, in the preferred embodiment, the internet 28. As shown in FIG. 1, workstations 33 and 35 link to internet 28, and communicate through internet 28, with either of hubs 25 and 26. Hub 25, in turn, communicates with towers 21 and 23, as well as other towers shown in FIG. 2 but not numbered. Hub 26 communicates with towers 36 and 41, as well as other towers shown in FIG. 2 but not numbered.

The hubs and towers are arranged in a pyramidic configuration. At the bottom of the pyramid (level 1) are numerous towers, each of which has a given coverage area. Tower 21 has a coverage area 22, tower 23 has a coverage area 24, and tower 36 has a coverage area 38. The coverage area is a function of the transmission and receiving characteristics of the respective towers and radios. Each tower can receive and transmit a signal to radio 19 when radio 19 is within its respective coverage area. In the preferred embodiment, the towers are arranged in groups of five.

Figure 2:
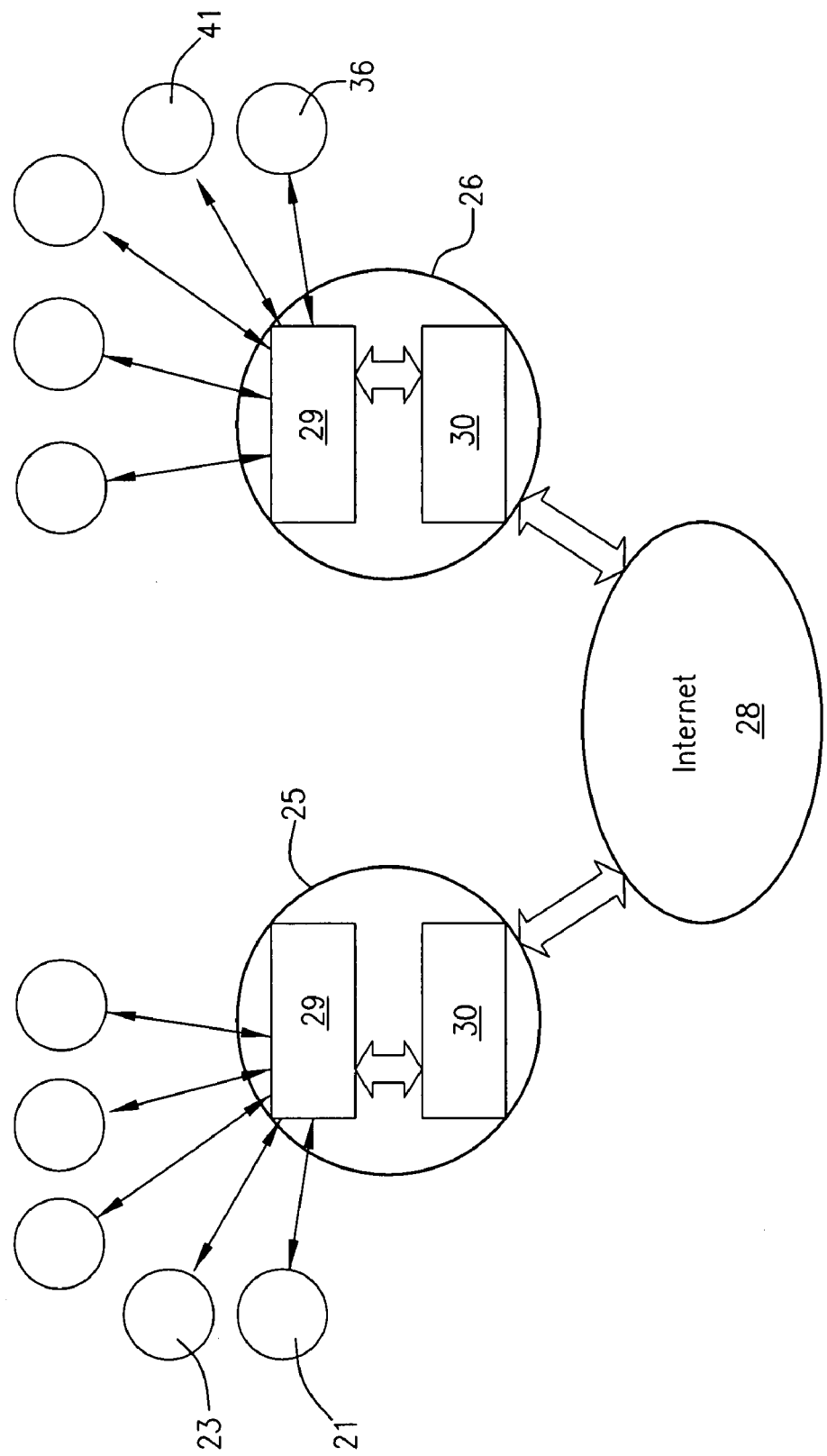
FIG. 2 is a schematic of the tower-hub-internet arrangement partially shown in FIG. 1.

As shown in FIG. 2, each tower in the group of five communicates with a local hub, 25 or 26 (level 2). Thus, for every five towers, there is one local hub. Each of the hubs, in turn, is linked with internet 28. By communicating through the internet 28, data from collection unit 20 can be made accessible at hub 25 or 26 to workstation 33 or 35. Workstations 33 and 35 may be located anywhere that has access to the internet 28, and data on hubs 25 and 26 may therefore be made accessible to users located large distances from the physical location of hubs 25 and 26. Messages can also be transmitted from workstation 33 or 35 to hub 25 or 26, and then transmitted from, for example, hub 25 to tower 21 and then to radio 19 when radio 19 is in coverage area 22.

Figure 3:
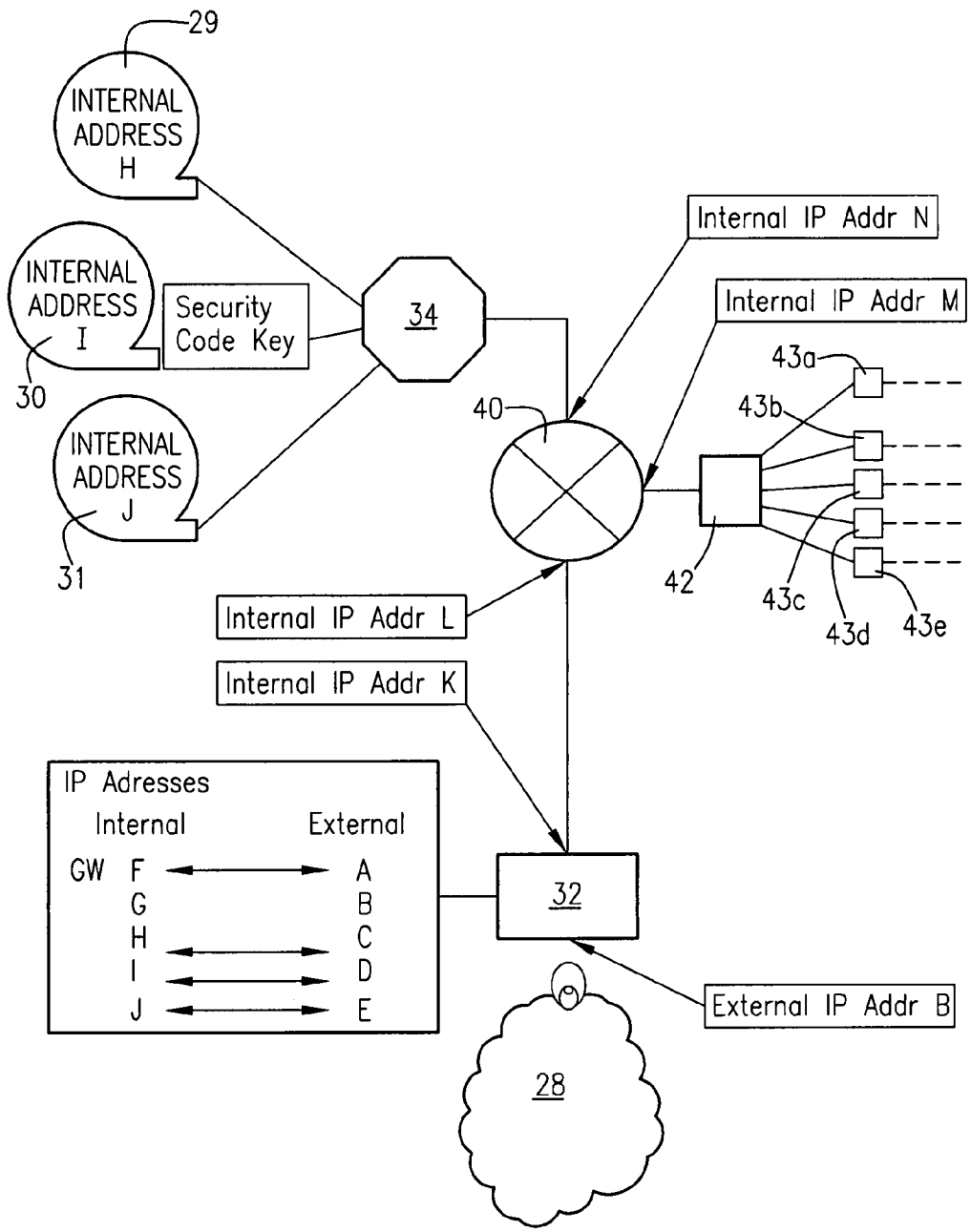
FIG. 3 is a detailed schematic of a hub shown in FIG. 2.
Figure 6:
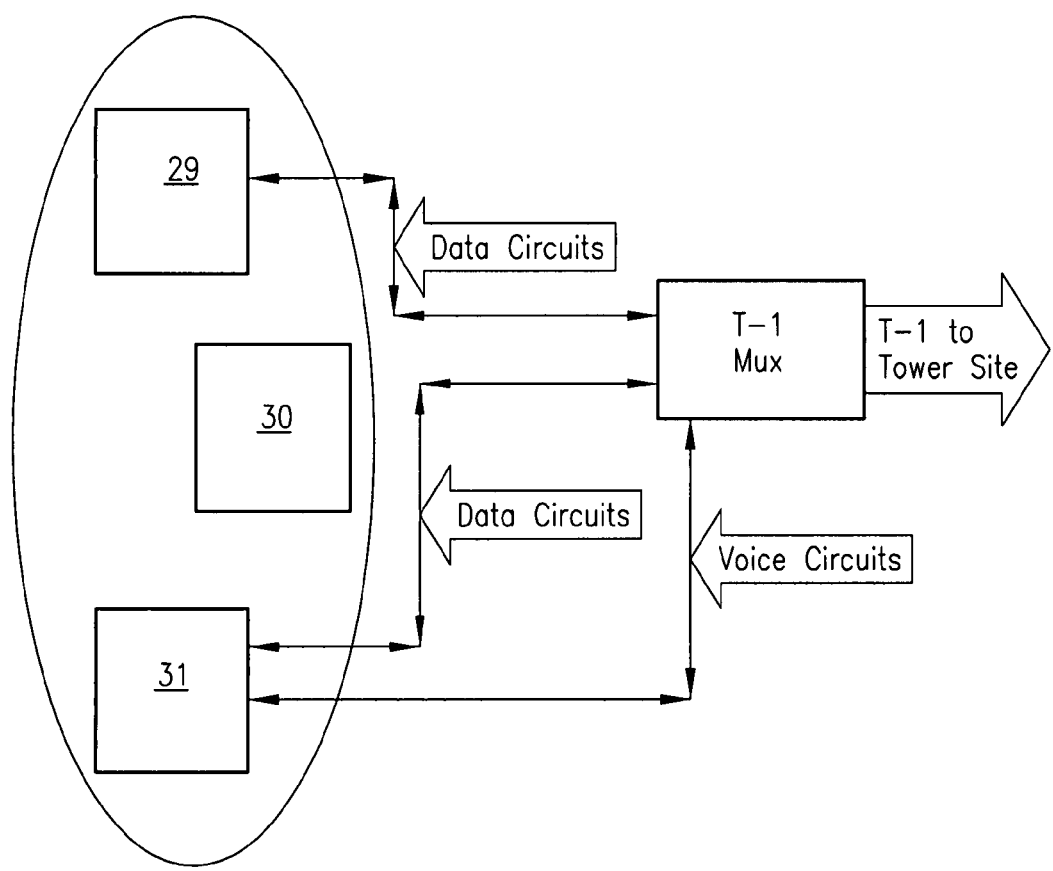
FIG. 6 is a detailed schematic of the data circuit for the hub shown in FIG. 4.
Figure 7:
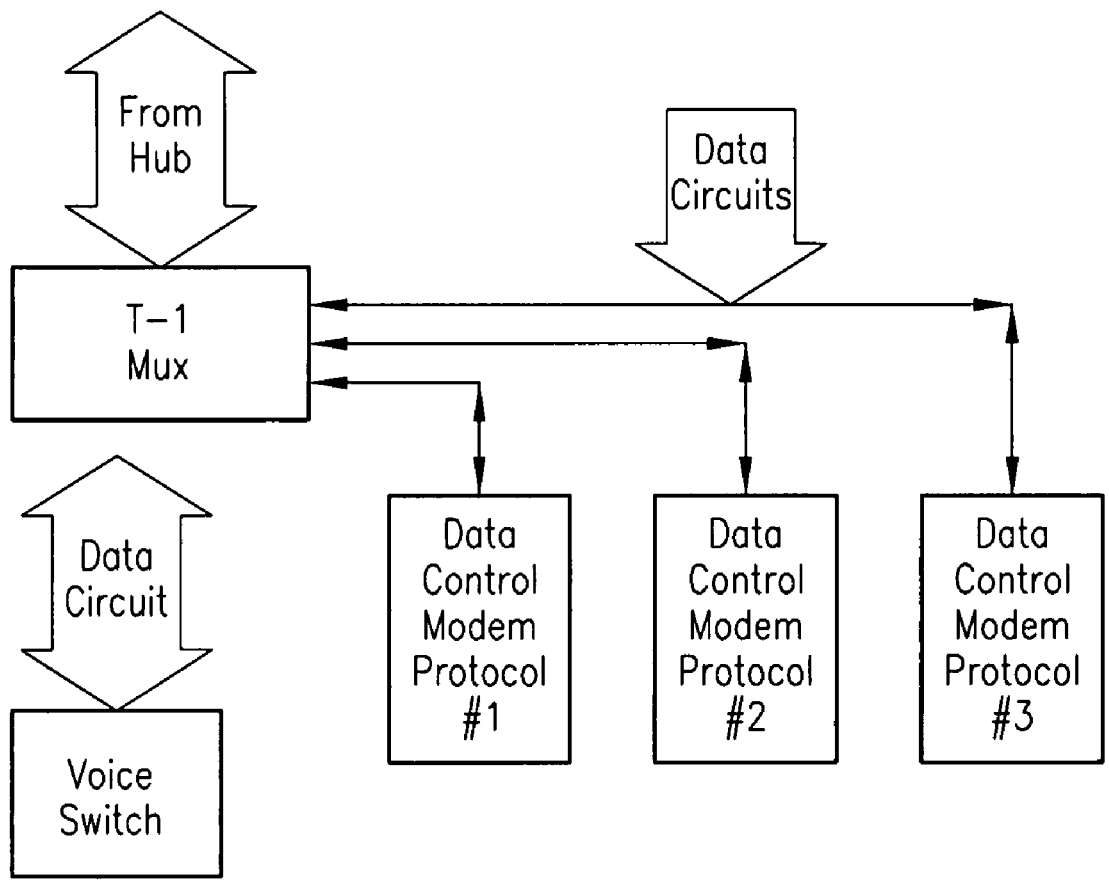
FIG. 7 is a detailed schematic of the data circuit of the tower shown in FIG. 4.

Tower 21 communicates with hub 25 by a T-1 connection. As shown in FIGS. 3, 6 and 7, T-1 muxes at both the hub and the tower allow multiplexing of the voice and data signals passing from the hub to the tower and vice versa. Towers 21, 23, 36 and 41 include a base radio that transmits and receives on both a voice and a data channel. The Fleetsync Radio, model TK-780K, manufactured by Kenwood Communications Corp., of 2201 East Dominguer St., Long Beach, Calif. 90810, may be employed in the preferred embodiment. The base radio includes a base microphone, a power supply, a base antenna and a tripod mount. The model KMC-9C base microphone manufactured by Kenwood Communications Corp., the model SLS-15 power supply manufactured by Astron Corporation, of 9 Autry, Irvine, Calif. 92618, the model MYA1506 base antenna manufactured by Maxrad, Inc., of 4350 Chandler Drive, Hanover Park, Ill. 60103, and the model TRT36 tripod mount manufactured by Rohn Industries, of 6718 West Plank Road, Peoria, Ill. 61604, may be employed in the preferred embodiment.

Radio 19 is a mobile radio which is able to communicate with towers 21, 23, 36 and 41 on both voice and data channels. Radio 19 has a self-registering auto roaming protocol. In the preferred embodiment, the protocol is LTR-NET or Passport. The protocol features data channel transmission using RF channels and signaling formats separate from the voice channel and traffic. In the preferred embodiment, the voice channel is the control channel. Radio 19 also has the ability to change to the data channel remotely as a function of a switch signal 4B transmitted through the enhanced voice protocol. Once radio 19 is directed to a data channel by the switch signal, it is capable of communicating on the data channel independently from the voice protocol and messaging. Thus, separate commands and directions are used when radio 19 is in its data mode. Radio 19 includes variable timers programmed into the data mode protocol to determine the functions of the data transmission format. For example, the protocol is such that radio 19 remains on its data channel for a variable amount of time. Once radio 19 receives a complete data transmission, the data transmission will contain a message that instructs radio 19 to remain on the data channel for additional data transmissions or, alternatively, it will contain a message that instructs the radio to return to its voice channel and await future voice transmissions.

Radio 19 has a voice channel protocol that identifies which tower it should transmit to depending on its location. Each voice channel has a data channel associated with it. Thus, depending on the voice channel for a given tower, and therefore that towers coverage area, there will be a different associated data channel. However, the same data channel may be used for different voice channels because of the greater range of the data transmission. The Fleetsync Radio, model TK-780K, manufactured by Kenwood Communications Corp., together with the model MHB1520M antenna kit manufactured by Maxrad, Inc., may be employed in the preferred embodiment.

Data collection unit 20 collects and generates data. In the preferred embodiment data collection unit 20 is a global positioning system which operates in conjunction with radio 19. The model KGP-1A/KCT29 GPS modem/receiver manufactured by Kenwood Communications Corp. may be used in the preferred embodiment. Collection unit 20 passes the data through either an internal or an external modem into and out of radio 19's RF transmitter and receiver circuitry on a specific data RF channel corresponding to tower 21, 23, 36, or 41 as the case may be. The RF data channel is determined and correlated from a specific towers voice channel and uses the automatic roaming feature inherent in the voice protocol of radio 19. As radio 19 leaves the coverage area 22 of a given tower 21, the voice protocol determines the next best available tower for communicating with the radio. When radio 19 generates a data transmission, the RF operating channel is predetermined in the network programming, and is correlated from the tower 21 corresponding to the coverage area 22 in which the radio is located.

GPS Software for data collection unit 20 is loaded on workstation 33 and 35 and on servers 29 and 30 of hubs 25 and 26. This software includes vehicle tracking functionality. Rastrac Software, model S404DSV400, provided by Manning NavComp, Inc., of 4205 Park Drive, Lago Vista, Tex. 78645, may be used in the preferred embodiment.

Radio 19 also has a display 39 connected to it. Such a display may be a laptop computer which allows the user to view data received by the radio over the communications network system from, ultimately, a workstation. Alternatively, the display may be internal to the radio.

As shown in FIG. 1, each hub operates independently of the other hubs. The internet is used as a conductive path for communications between multiple workstations and multiple hubs. As shown in FIGS. 2-3, hubs 25 and 26 include a first server 29, a second server 30, and a third server 31. Servers 29 and 30 are the data collection and transfer devices for each hub and are connected in a local area network fashion to communicate with each other and with third server 31. Server 29 communicates with the towers and with server 30. Server 30 sorts the data and communicates through the internet with workstations 33 and 35. Server 31 is a voice switch server and communicates with the other two servers and essentially tracks the location of radio 19, and multiple other radios, used in the system.

Server 29 is a standard processor/server having a serial port expander. The number of ports needed will vary depending on the traffic and the protocols being run. The number of protocols in turn depends on the types of data collection devices and the number of languages therefore used for data transmissions. For example, a global positioning unit will have one protocol, email will have a second protocol and voice will have a third protocol.

First server 29 is responsible for all communications with the associated tower locations, e.g. 21 and 23. Server 29 collects, receives and transmits all the data messages to and from any and all towers connected to the hub. Server 29 thus includes an operating server with multiple serial communication ports provided through a serial port expander with associated modules. In the preferred embodiment, the configuration supports 64 simultaneous serial port communications with the number of ports determined by total towers, protocols and required data transmissions. The DIGI 16RJ45 Port Module, model 76000074, manufactured by DIGI International, of 11001 Bren Road East, Minnetonka, Minn. 55343, with the Proliant PIII 1 gig server, model 193706-001, with 128 MB SD RAM model 128277-B21 and two 9.1 GB hard drives, manufactured by Compaq Computer Corporation, of P.O. Box 692000, Houston, Tex. 77269-2000, may be employed in the preferred embodiment.

All data is transferred through server 30. Server 30 sorts the data in a predetermined format in accordance with preselected requirements. It also may sort data based on subcategories. Server 30 is a standard processor/server which communicates with at least one workstation through the internet and operates as the hubs interface between server 29 and the workstations. Server 30 sorts data based on where the data was received from and where it is therefore authorized to be sent. As an example, data will be sorted based on the radio through which it was received and the work station which is allowed access to data from that radio. Each radio is programmed with a "K-header." In the preferred embodiment, the K-header is the radio identifier. The K-header is a number programmed into the radio and, each time data is sent from that radio, the data is essentially wrapped in the K-number. The K-number of a radio will correspond to a preselected code-plug used with workstation 33 or 35. Server 30 has allocated storage space for each serialized code-plug used in the system with a workstation. Thus, as data is transmitted or received through server 29 and the towers, server 30 sorts and routes the data to the workstation having the specified code-plug according to a predetermined routing table. If a specific workstation with an authorized code-plug is logged into server 30 via the internet, a data transmission occurs between the radio and the workstation. However, if none of the authorized workstations are logged in and a data message is received by server 30, server 30 will buffer and store the message for each serialized code-plug in its database. Each workstation on the communication system has one or more code-plugs. In the preferred embodiment, the code-plug is the station identifier.

Besides having a code-plug, workstation 33 is programmed with a permanent internet protocol ("IP") address on its input/output protocol ("IOP") file which grants it permission to access a hub through its IP address port. Workstation 33 may have one or more addresses programmed into its IOP file. The IOP is a bidirectional port on workstation 33 and thus allows the workstation to communicate bidirectionally with multiple hubs simultaneously. The IP address corresponds with sonic wall 32. In the preferred embodiment, each hub has five permanent IP addresses. When workstation 33 is on, and the program is booted, workstation 33 automatically connects through the internet and to server 30. Thus, a user on the workstation may see data in realtime as well as be able to receive data stored on server 30. Workstation 33 may be a laptop or a desktop computer, or some other device which allows access on the internet. A Pentium processor with 16 MB RAM, 10 MB Free Disk Space, serial and parallel ports, and a SVGA display, may be employed in the preferred embodiment.

Servers 29 and 30 in turn connect through the hub network to server 31. Server 31 is the specialized mobile radio server and controllers communications on the voice channel and contains the voice protocol. The SMR Link Advanced Process, model 480-100, with the SMR Switch Module Shelf, model 440-300, ArcNet Router, model 470-300, and Switch I/O Module, model 440-180, manufactured by Arctek Telecom Corp., of 1269 South Broad Street, Wallingford, Conn. 06492, may be used in the preferred embodiment. The LTR-Net protocol provided by E F Johnson, of 299 Johnson Avenue, Waseca, Minn. 56093, and the Passport Protocol from Trident Micro Systems, of Two Trident Drive, Arden, N.C. 28704, may be used in the preferred embodiment.

Servers 29, 30 and 31 are connected by switch 34, which allows communication between all three of the servers. The SuperStack II 3300 switch, model 3C16981, manufactured by 3Com Corporation, of 5400 Bayfront Plaza, P.O. Box 58145, Santa Clare, Calif. 95052, with Omni View Pro, model 10108-ODS, manufactured by Belkin Components, of 501 West Walnut Street, Compton, Calif. 90220, and the DIGI 16RJ45 Port Module, model 76000074, manufactured by DIGI International may be used in the preferred embodiment. The servers share radio registration and communicate amongst themselves regarding the location of each radio. When an incoming data message is received from a workstation, the hub determines which IOP of server 29 will be needed in order to successfully complete the transmission of the data to radio 19 and attached display device 20. Server 30 receives the data message via the internet and then interfaces with server 31 to determine which tower the radio is registered with. Then, in conjunction with server 29, the radio is notified through server 31 on the voice channel that it has a data message ready to be sent. When the radio has switched to the data channel and is ready to receive the data message, a prompt is sent over the data channel via the radio to the associated tower and is relayed from the tower to server 29. Server 29 then notifies server 30. Since server 30 has the message stored in its buffer, server 30 release the stored data message and the data is transmitted through the network to the radio unit.

As shown in FIGS. 3, 6 and 7, hub 25 also includes a mux hub 42 connected to five T-1 muxes 43a-e, one for each tower connected to hub 25. Mux hub 42 is connected to router 40 and allows diagnostics of its five associated T-1 muxes. The Rad Megaplex 2100, model MP2100/T/C/115, with Megaplex Control Module, model MCL, Megaplex T-1 I/O, model MTML-1 T-1, Megaplex 4 Channel Voice, model VC-QE&M, Megaplex low Sp Data, model HS-R, and Megaplex power supply, model PS-100 A/C, manufactured by Rad Data Communications Ltd., of 24 Raoul Wallenberg St., Tel-Aviv 69719, Israel, may be used in the preferred embodiment.

Hub 25 communicates with the internet through a sonic firewall 32. Firewall 32 takes the fixed IP address from a workstation and changes it to an internal IP address. Firewall 32 is programmed with certain acceptable IP addresses. Each of these IP addresses are protected and translated in sonic wall 32 and then routed to their specific servers and hubs. Thus, with respect to communications with workstation 33, firewall 32 changes the IP address to the internal address for server 30. Sonic wall 32 contains a variety of specifically assigned predetermined IP addresses in addition to certain IP addresses used to communicate with workstation 33. For example, firewall 32 will have IP addresses for diagnostic purposes or programming purposes. These diagnostic and programming IP addresses allow access to all the servers as well as the router and muxes. The So Ho 2 sonic wall with ten IP address capability manufactured by Sonic Wall, Inc., of 1160 Bordeaux Drive, Sunnyvale, Calif. 94089-1209, may be employed in the preferred embodiment.

The message is then sent from firewall 32 to router 40. The Cisco 2621 Dual 10/100 Enet router, model 71755 with the Cisco 2600/3600 1 port Enet, model 816075, manufactured by Cisco Systems, Inc., of 170 West Tasman Drive, San Jose, Calif. 95134, may be used in the preferred embodiment. Router 40 then sends the message to server 31 if it is from a user on a workstation. If the message is not from a user on a workstation, but rather is associated with diagnostics, programming, maintenance or internal functions other than transmissions between a radio and a workstation, router 40 would allow for routing to the other servers or muxes for diagnostic and programming purposes.

Each hub has a variable amount of towers connected to it, the number of towers being determined by the traffic loading, network conductivity, geographic location and voice channel protocol design factors. Hub 25 will have multiple data connection circuits to each tower, each circuit representing and corresponding to each data protocol language it has the capacity and authorization to operate. As shown in FIG. 7, each tower has multiple modems which interface the digital network data communications to the control devices for transmitting to the radio units through the RF base station. Each tower may have multiple RF base stations for the purpose of transmitting data messages. The number of which would be determined by the protocols, traffic loading, potential user base, geographic location and site RF coverage.

Figure 4:
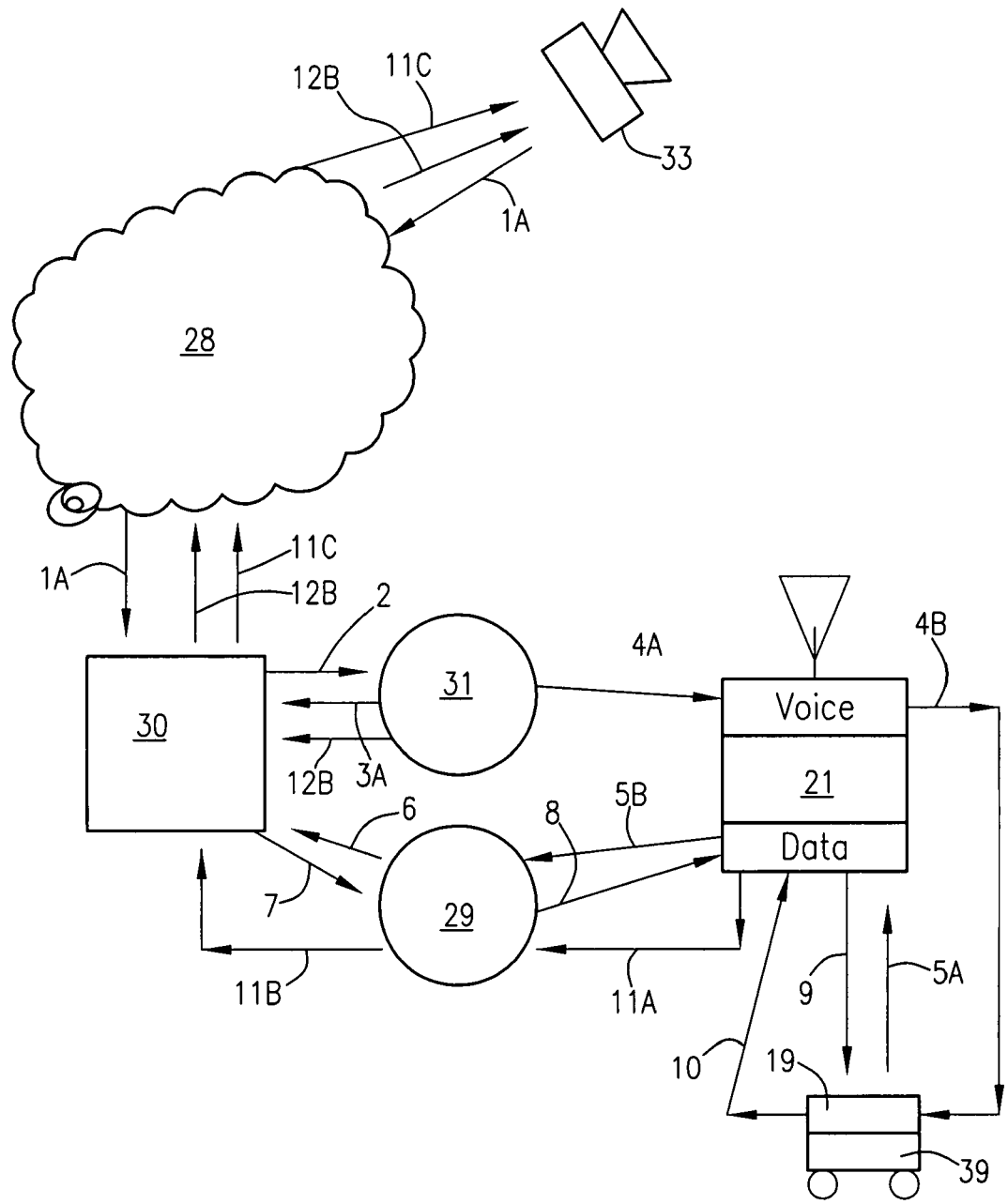
FIG. 4 is a schematic of the communication transmission circuit from the workstation to the display device shown in FIG. 1.

Transmissions between a radio and a workstation are bidirectional. As shown in FIG. 4, when transmitting a message from workstation 33 to the radio 19, workstation 33 sends a signal 1A through the internet to server 30 using a constant IP address. Thus, the workstation does not necessarily communicate with the server through a browser. Rather, the workstation has a fixed IP address and is programmed to connect directly with server 30.

Each hub has a fixed IP address such that signals from a workstation will be sent to all IP addresses (or hubs), and the radio corresponding to that workstations code-plug will be selected and the message will be transmitted to that radio. If no response is received, an incomplete message may be returned. This is a parallel transmission approach. Alternatively, a serial approach may be used in which the message being sent from a workstation to a radio will be sent to the last active IP address from which a transmission from the radio was received by the workstation. If no response is received or a data retry is received the workstation will then loop through each authorized IP address in its file. The workstation thus has a list of authorized hubs that it will work through in series.

When message 1A is received by server 30, the message is in turned stored in the buffer of server 30. As shown in FIG. 4, server 30 then sends a "prompt signal" 2 to server 31 requesting the location of the radio that the data transmission is addressed to. If the radio is already registered with server 31, a signal 3 is sent from server 31 to server 30 acknowledging and indicating that server 30 should await transmission. If the radio is not registered at server 31, server 31 sends a signal 3 to server 30 indicating that the radio is not registered. In this case, server 31 sends a signal 12B through the internet to workstation 33 indicating that the radio was not registered with server 31. When workstation 33 receives this message, if in a serial orientation, it will then work through its other authorized IP addresses corresponding to other hubs, repeating the process until a server in another hub acknowledges that it has the subject radio registered in its database.

If the radio is registered with server 31, server 31 then transmits a signal 4 to tower 21. Tower 21 then transmits a sub audible "switch signal" 4B to radio 19 on radio 19's voice channel or on another specific control channel indicating that a data message is waiting to be sent by server 30. This "switch signal" is transmitted pursuant to the voice protocol used on the voice channel that the radio is programmed on when it is waiting for voice traffic or incoming data messages. Radio 19 then transmits a "clear to-receive signal" 5A on a data channel that is preprogrammed in the radio and associated with the voice protocol. This message 5A is received at tower 21 and tower 21 then transmits a signal 5B to server 29 through the proper IOP. Server 29 sends a "server transmit signal" 6 to server 30 notifying server 30 that it has received the radio acknowledgment and has registered the radio on a specific data channel and IOP. Server 30 sends 7 the message that it has stored in its buffer to server 29. Data server 29 processes and sends 8 the data message when the proper IOP and tower data channel are clear for new traffic. At tower 21 the data control station IOP and data repeater send 9 the message to radio 19. Radio 19 receives the message, checks the data for completeness and then sends a reply signal 10 to tower 21. Radio 19 then sends the message to display 39 for viewing access by a user. If the message was received completely, reply signal 10 is a "received-complete" message. If the message is not received completely, reply signal 10 is a "data retry" message. The return message from the radio is transmitted 11A from tower 21 to server 29 and is sent 11B from server 29 to server 30. The fact that a complete message has been sent is then passed 11C from server 30 through the internet to workstation 33. The workstation will then display a completed message prompt and the data message is erased from the buffer of server 30. Alternatively, a "data retry" message will cause server 30 to start at step 7 and retry the transmission of the data message. A software font, variable with each unit programmed in the system, determines the number of retries. The workstation will either receive a data complete or a data incomplete prompt.

Figure 5:
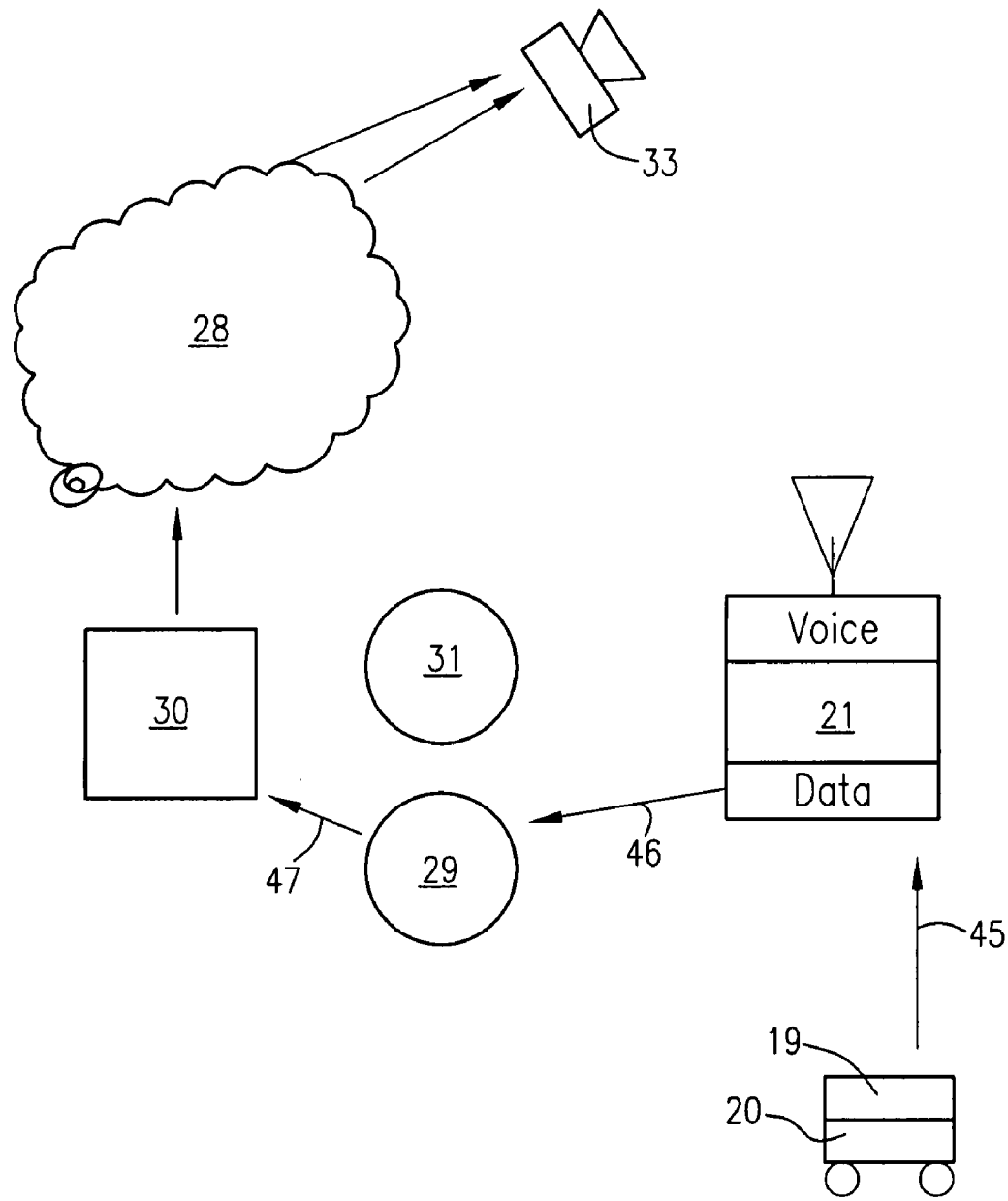
FIG. 5 is a schematic of the communication transmission circuit from the collection unit to the workstation shown in FIG. 1.

With respect to transmissions from data collection unit 20 to workstation 33, as shown in FIG. 5, data collection unit 20 is arranged to transfer the data to radio 19. Radio 19 then transmits 45 the data on the data channel to tower 21 when radio 19 is within coverage area 22. Tower 21 then transmits 46 the data through a T-1 connection to server 29. The data is then transferred 47 to server 30 where it is sorted and made available through internet 28 to workstation 33 as follows. The message is transmitted from server 30 to router 40 and then transmitted from router 40 through firewall 32 to the internet. Thus, when receiving data from radio 19, hub 25 receives and processes the data through server 29 and then notifies server 30 that it has received a data transmission from radio 19. Server 29 then relays the message through switch 34 to server 30. Server 30 then transmits this data through switch 34 to router 40. Router 40 then routes the message to sonic wall 32, where it creates a network address translation ("NAT") between the internal IP and the external IP address of the workstation.

As mentioned above, each radio has an associated K-number, or radio identifier, programmed into it. Similarly, each workstation has a hard-wired code-plug, or station identifier. Thus, all data has a K-number attached to it when it is transmitted by the radio. Server 29 will receive the data and transmit it to server 30. Server 30 then collates the K-number associated with the data with the appropriate code-plug that corresponds to that radio. Thus, all the data is sorted by K-number and code-plug. Once it is sorted, server 30 then makes the data available to the workstation having the corresponding code-plug. If a workstation with the corresponding code-plug is logged on at that time, the user on the workstation will be able to view the data in realtime. Otherwise, the data is stored in server 30 until the workstation logs in.

Modifications

The present invention contemplates that many changes and modifications may be made. For example, the number of servers in each hub may be increased based on traffic volume. Similarly, the number of towers connected to each hub may be readily varied. The data collection unit may be a global positioning system or, alternatively, some other type of data collection unit such as an engine temperature gauge, an electronic fuel monitor, a vehicle odometer, a taxi fare meter, an engine control interface, or a laptop computer. The data collection unit may be an internal hardware component of the radio or may be connected externally to the radio. Similarly, the display device may be internal or external to the radio. It is also contemplated that other types of intermediary computer networks besides the internet or worldwide web may be employed, such as a wide area network, a local area network or a network that employs satellite communications. Transmissions may be analog or digital. The number of radios and workstations may be readily varied depending on the number of different users or clients using the system. The communications between towers and hubs may be by a T-1 connection, or a partial T-1 or other data circuit.

Therefore, while the presently preferred form of the communications system has been shown and described, and several modifications discussed, persons skilled in this art will readily appreciate that various additional changes and modifications may be made without departing from the spirit of the invention, as defined and differentiated by the following claims.

What is claimed is:

1. A network system for communicating data to a user, comprising:
   a radio;
   said radio operatively adapted to transmit on a data channel and a control channel and to selectively alternate between transmitting on said data channel and transmitting on said control channel;
   a data collection unit;
   said data collection unit operatively adapted to communicate with said radio;
   a first tower having a defined first coverage area;
   said first tower operatively adapted to communicate with said radio when said radio is in said first coverage area;
   a hub;
   a computer network;
   said hub operatively adapted to communicate with said first tower and with said computer network;
   said data collection unit, radio, first tower and hub so configured and arranged that data from said collection unit is transmittable by said radio to said first tower when said radio is in said first coverage area, is transmittable from said first tower to said hub, and is accessible to said user via said computer network.

2. The network system set forth in claim 1, wherein said data collection unit is selected from a group consisting of a temperature gauge, an electronic fuel monitor, a global positioning system, an odometer, a fare meter, an engine control interface, and a laptop computer.

3. The network system set forth in claim 1, wherein said data collection unit is an internal component of said radio.

4. The network system set forth in claim 1, wherein said control channel comprises a voice channel.

5. The network system set forth in claim 1, wherein said control channel comprises a tower marker beacon.

6. The network system set forth in claim 1, wherein said control channel is a function of said defined coverage area.

7. The network system set forth in claim 6, wherein said data channel is a function of said control channel.

8. The network system set forth in claim 1, wherein said radio has automatic roaming capability.

9. The network system set forth in claim 1, and further comprising:
   a second tower having a defined second coverage area;
   said second tower operatively adapted to communicate with said radio when said radio is in said second coverage area;
   said hub operatively adapted to communicate with said second tower;
   said data collection unit, radio, second tower and hub so configured and arranged that data from said collection unit is transmittable by said radio to said second tower when said radio is in said second coverage area, is transmittable from said second tower to said hub, and is accessible to said user via said computer network.

10. The network system set forth in claim 1, wherein said hub comprises a first server operatively adapted to communicate with said first tower and a second server operatively adapted to communicate with said computer network and said first server.

11. The network system set forth in claim 9, wherein said hub comprises:
   a first server operatively adapted to communicate with said first tower and said second tower;

a second server operatively adapted to communicate with said computer network and said first server; and a third server operatively adapted to communicate with said first tower, said second tower, said first server and said second server.

12. The network system set forth in claim 11, wherein said third server communicates, through one of said towers, with said radio.

13. The network system set forth in claim 11, wherein said first server communicates, through one of said towers, with said radio on said data channel.

14. The network system set forth in claim 10, wherein said hub comprises a firewall between said computer network and said second server.

15. The network system set forth in claim 1, wherein said radio includes a radio identifier that is associated with data transmitted by said radio.

16. The network system set forth in claim 15, and further comprising a user workstation operatively adapted to communicate with said hub via said computer network.

17. The network system set forth in claim 16, wherein said workstation is a personal computer.

18. The network system set forth in claim 16, wherein said workstation includes a station identifier that is associated with said workstation.

19. The network system set forth in claim 18, wherein:
said radio identifier corresponds to said station identifier;
said hub is configured and arranged to operatively sort data based on the radio identifier associated with said data; and
said hub is configured and arranged such that data associated with said radio identifier is selectively accessible to a workstation having a station identifier corresponding to said radio identifier.

20. The network system set forth in claim 11, and further comprising a switch connecting said first server, second server and third server.

21. The network system set forth in claim 1, wherein said computer network comprises the world wide web.

22. The network system set forth in claim 1, wherein said computer network comprises a wide area network.

23. The network system set forth in claim 1, wherein said computer network comprises a local area network.

24. The network system set forth in claim 23, wherein said computer network comprises a communications satellite.

25. The network system set forth in claim 19, and further comprising a second workstation having a second station identifier corresponding to said radio identifier.

26. The network system set forth in claim 1, wherein said data and control channels are digital.

27. The network system set forth in claim 1, wherein said data and control channels are analogue.

28. The network system set forth in claim 1, and further comprising:
a second tower having a defined second coverage area;
said second tower operatively adapted to communicate with said radio when said radio is in said second coverage area;
a second hub operatively adapted to communicate with said second tower and with said computer network;
said data collection unit, radio, second tower and second hub so configured and arranged that data from said collection unit is transmittable by said radio to said second tower when said radio is in said second coverage area, is transmittable from said second tower to said second hub, and is accessible to said user via said computer network.

29. A network system for communicating a signal, comprising:
a radio;
said radio operatively adapted to receive on a data channel and a control channel and to selectively alternate between receiving on said data channel and receiving on said control channel;
a display device;
said display device operatively adapted to communicate with said radio;
a first tower having a defined first coverage area;
said first tower operatively adapted to communicate with said radio when said radio is in said first coverage area;
a hub;
a computer network;
said hub operatively adapted to communicate with said first tower and with said computer network;
a user workstation;
said user workstation operatively adapted to communicate with said hub via said computer network;
said workstation, hub, first tower, radio and display device so configured and arranged that a signal from said workstation is transmittable from said workstation to said hub via said computer network, is transmittable from said hub to said first tower, is transmittable from said first tower to said radio when said radio is in said first coverage area, and is displayable on said display device.

30. The network system set forth in claim 29, wherein said display device is a computer monitor.

31. The network system set forth in claim 29, wherein said control channel comprises a voice channel.

32. The network system set forth in claim 29, wherein said control channel comprises a tower marker beacon.

33. The network system set forth in claim 29, wherein said radio has automatic roaming capability.

34. The network system set forth in claim 29, and further comprising:
a second tower having a defined second coverage area;
said second tower operatively adapted to communicate with said radio when said radio is in said second coverage area; and
said hub operatively adapted to communicate with said second tower;
said workstation, hub, second tower, radio and display device so configured and arranged that a signal from said workstation is transmittable from said workstation to said hub via said computer network, is transmittable from said hub to said second tower, is transmittable from said second tower to said radio when said radio is in said second coverage area and is displayable on said display device.

35. The network system set forth in claim 29, wherein said hub comprises a first server operatively adapted to communicate with said tower and a second server operatively adapted to communicate with said computer network and said first server.

36. The network system set forth in claim 34, wherein said hub comprises:
a first server operatively adapted to communicate with said first tower and said second tower;
a second server operatively adapted to communicate with said computer network and said first server; and
a third server operatively adapted to communicate with said first tower, said second tower, said first server and said second server.

37. The network system set forth in claim 35, wherein said hub comprises a firewall between said computer network and said second server.

38. The network system set forth in claim 36, wherein said third server communicates, through one of said towers, with said radio.

39. The network system set forth in claim 36, wherein said first server communicates, through one of said towers, with said radio on said data channel.

40. The network system set forth in claim 29, wherein said radio includes a radio identifier that is associated with said radio.

41. The network system set forth in claim 40, wherein said workstation includes a station identifier that is associated with signals transmitted from said workstation.

42. The network system set forth in claim 41, wherein:
said radio identifier corresponds to said station identifier;
said hub is configured and arranged to operatively sort signals based on the station identifier associated with said signal; and
said hub is configured and arranged such that signals associated with said station identifier are selectively transmittable to a radio having a radio identifier corresponding to said station identifier.

43. The network system set forth in claim 36, and further comprising a switch connecting said first server, second server and third server.

44. The network system set forth in claim 29, wherein said computer network comprises the world wide web.

45. The network system set forth in claim 29, wherein said computer network comprises a wide area network.

46. The network system set forth in claim 29, wherein said computer network comprises a local area network.

47. The network system set forth in claim 46, wherein said computer network comprises a communications satellite.

48. The network system set forth in claim 42, and further comprising a second workstation having a second station identifier corresponding to said radio identifier.

49. The network system set forth in claim 29, wherein said data and control channels are digital.

50. The network system set forth in claim 29, wherein said data and control channels are analogue.

51. The network system set forth in claim 29, and further comprising:
a second tower having a defined second coverage area;
said second tower operatively adapted to communicate with said radio when said radio is in said second coverage area;
a second hub operatively adapted to communicate with said second tower and with said computer network;
said workstation, second hub, second tower, radio and display device so configured and arranged that a signal from said workstation is transmittable from said workstation to said hub via said computer network, is transmittable from said hub to said first tower, is transmittable from said first tower to said radio when said radio is in said second coverage area, and is displayable on said display device.

52. A method for communicating a signal comprising the steps of:
providing a radio;
providing a display device operatively adapted to communicate with said radio;
providing a first tower having a defined first coverage area and operatively adapted to communicate with said radio when said radio is in said first coverage area;
providing a computer network;
providing a server hub operatively adapted to communicate with said first tower and said computer network;
providing a workstation operatively adapted to communicate with said hub via said computer network;
providing said hub with a first server operatively adapted to communicate with said first tower;
providing said hub with a second server operatively adapted to communicate with said computer network and said first server;
transmitting said signal from said workstation to said second server via said computer network;
transmitting said signal from said second server to said first server;
transmitting said signal from said first server to said first tower;
transmitting said signal from said first tower to said radio;
displaying said signal on said display device;
providing a second tower having a defined second coverage area and operatively adapted to communicate with said radio when said radio is in said second coverage area;
providing a third server operatively adapted to communicate with said first tower, said second tower, said first server and said second server;
sending a notice from said third server to said radio indicating that said radio is to receive a transmission on a data channel of said radio;
sending a notice from said radio to said first server indicating that said radio is ready to receive a transmission on said data channel; and
sending a notice from said first server to said second server prompting said second server to transmit said signal.

53. The method set forth in claim 52, and further comprising the steps of:
providing a firewall;
providing a router operatively adapted to communicate with said firewall, said first server and said second server;
transmitting said signal from said workstation to said firewall;
said firewall creating a network address translation;
transmitting said signal from said firewall to said router; and
transmitting said signal from said router to said second server.

54. The method set forth in claim 52, and further comprising the steps of:
associating a radio identifier with said radio;
associating a station identifier with signals transmitted from said workstation;
said hub corresponding said radio identifier with said station identifier;
said hub sorting signals based on the station identifier associated with said signal;
transmitting signals associated with said station identifier to a radio having a radio identifier corresponding to said station identifier.

55. The method set forth in claim 54, and further comprising the step of providing a second radio having a second radio identifier corresponding to said station identifier.

56. The method set forth in claim 52, and further comprising the steps of:
providing said hub operatively adapted to communicate with said second tower;

transmitting said signal from said hub to said second tower when said radio is in said second coverage area; and transmitting said data from said second tower to said hub.

57. The method set forth in claim 56, and further comprising the step of determining if said radio is in said first coverage area or said second coverage area.

58. The method set forth in claim 52, and further comprising the steps of:
   providing a second hub operatively adapted to communicate with said second tower and with said computer network;
   transmitting said signal from said workstation to said second hub via said computer network when said radio is in said second coverage area;
   transmitting said signal from said second hub to said second tower; and
   transmitting said signal from said second tower to said radio.

59. The method set forth in claim 58, and further comprising the step of determining if said radio is in said first coverage area or said second coverage area.

60. The method set forth in claim 59, wherein said step of determining if said radio is in said first coverage area or said second coverage area comprises the step of first determining if said radio is in the coverage area the radio last transmitted or received from.

61. A radio switching system comprising:
   a radio;
   said radio operatively adapted to transmit and receive on a control channel or a data channel and to roam on said control channel;
   said control channel having a switching protocol that defines a switch signal;
   a tower having a defined coverage area and operatively adapted to communicate with said radio when said radio is in said coverage area;
   a hub operatively adapted to communicate with said tower;
   said hub comprising a first server operatively adapted to communicate with said tower, a second server operatively adapted to store data and to communicate with said first server, and a third server operatively adapted to communicate with said tower and said first server and to initiate the transmission of said switch signal;
   said radio operatively adapted to switch said radio from receiving on said control channel to receiving on said data channel when said radio receives a switch signal;
   said hub operatively adapted to initiate the transmission of said switch signal;
   said radio operatively adapted to send a clear-to-receive signal to said first server on said data channel after receiving said switch signal;
   said first server operatively adapted to send a server-transmit signal to said second server after receiving said clear-to-receive signal;
   said second server operatively adapted to transmit said data to said first server after receiving said server-transmit signal; and
   said first server operatively adapted to transmit said data to said tower after said first server receives said data from said second server.

62. The radio switching system set forth in claim 61, wherein said control channel comprises a voice channel.

63. The radio switching system set forth in claim 61, wherein said control channel comprises a tower marker beacon.

64. A method for switching a radio from a control channel to a data channel, the method comprising the steps of:
   providing a radio operatively adapted to transmit and receive on a control channel or a data channel;
   providing said control channel with a switching protocol that defines a switch signal;
   providing a tower having a defined coverage area and operatively adapted to communicate with said radio when said radio is in said coverage area;
   providing a first server operatively adapted to communicate with said tower;
   providing a second server operatively adapted to store data and to communicate with said first server;
   providing a third server operatively adapted to communicate with said tower and said first server;
   sending a prompt signal from said second server to said third server;
   said third server initiating the sending of said switch signal from said first tower to said radio after receiving said prompt signal from said second server;
   said radio switching from receiving on said control channel to receiving on said data channel after receiving said switch signal;
   sending a clear-to-receive signal from said radio to said first server on said data channel after receiving said switch signal;
   sending a server-transmit signal from said first server to said second server after said first server receives said clear-to-receive signal;
   transmitting said data from said second server to said first server after said second server receives said server-transmit signal; and
   transmitting said data from said first server to said tower after said first server receives said data from said second server.

* * * * *